June 27, 1944.  H. F. OSWALD  2,352,340
FILTER
Filed April 10, 1942
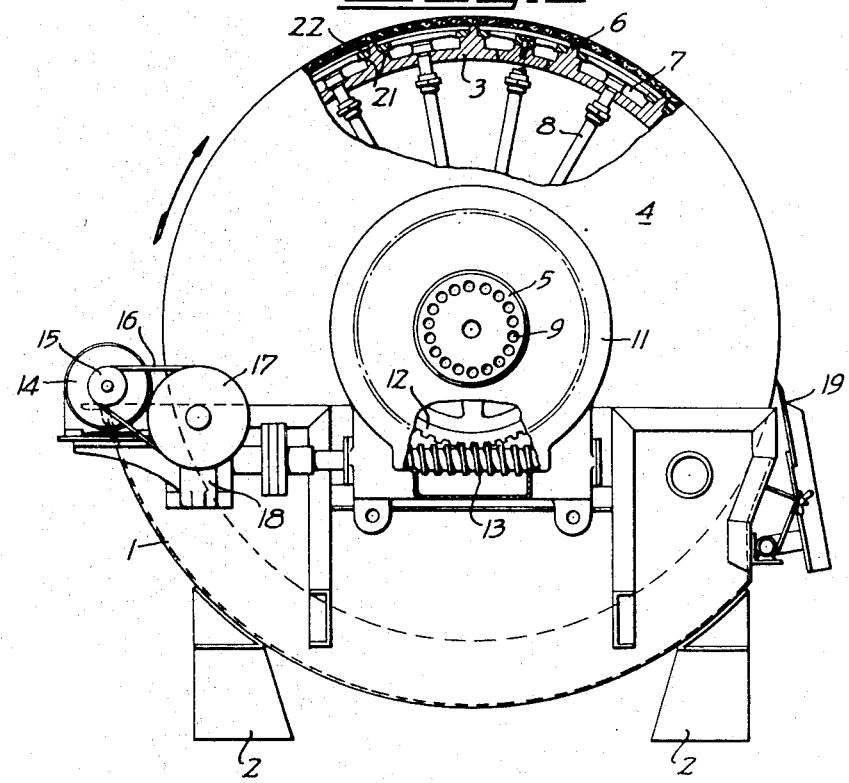
INVENTOR
HAROLD F. OSWALD
BY
ATTORNEY Patented June 27, 1944

2,352,340

UNITED STATES PATENT OFFICE 2,352,340

FILTER

Harold F. Oswald, Elizabeth, N. J., assignor to Oliver United Filters Incorporated, Oakland, Calif., a corporation of Nevada Application April 10, 1942, Serial No. 438,389

6 Claims. (Cl. 210—199)

This invention relates in general to continuous rotary drum filters and more particularly to means for securing the wire mesh undercover of a rotary drum filter to the ribbed cast iron drainage screens disposed within each of the filtrate compartments of the filter drum.

Wood pulp for use as a source of cellulose and for other purposes is sold to the trade in dry rolls. This form is resorted to primarily for two reasons: It is sold in the dry form for the purpose of decreasing freight charges, and it is sold in rolls to conserve space during transportation and while in storage. To wind the pulp sheet into rolls, it is essential that the sheet be of uniform thickness and that it have a relatively high tensile strength and be free of weakened zones. In the past, it has been customary to form sheets of this character on a so-called "cylinder mold," the sheet then being passed through suitable press rolls for condensing the sheet and eliminating as much of its water content as possible, and then through drier rolls onto a winder which winds the sheet into the desired rolls.

In general, the object of this invention is the provision of a rotary drum filter so constructed that it may be substituted as a sheet former for the cylinder molds heretofore used in the manufacture of pulp sheet.

More specifically, the object of this invention resides in the provision of means for securing either the wire mesh undercover or the wire mesh filter medium of a rotary drum filter at spaced points to the cast iron drainage members or screens disposed and secured within each of the filter drum compartments, without resorting to the use of a wire winding, and so that creepage between the undercover and the supporting screens or members will be avoided.

The invention possesses other advantageous features, some of which with the foregoing will be set forth at length in the following description where that form of the invention which has been selected for illustration in the drawing accompanying and forming a part of the present specification is outlined in full. In said drawing, one form of the invention is shown, but it is to be understood that it is not limited to such form, since the invention as set forth in the claims may be embodied in a plurality of forms.

Referring to the drawing:

Figure 1 is an end elevation of a continuous rotary drum filter embodying the objects of my invention, partly in section, the better to illustrate its construction.

Figure 2 is an enlarged top plan view of one of the cast iron ribbed drainage screens shown in Figure 1.

Figure 3 is an enlarged sectional detail taken on the line 3—3 of Figure 2.

As shown in Figure 1, the objects of my invention have been embodied in a continuous rotary drum filter comprising a filter tank 1 supported on base members 2. Arranged to rotate within this tank and through the body of pulp carried therein, is a filter drum 3 provided at either end with drum heads 4 and with trunnions 5 by means of which it is journaled in suitable bearings (not shown) supported by the tank 1.

The outer surface of the drum 3 is formed with a plurality of peripherally spaced, longitudinally extending division strips 6, defining filtrate compartments 7. Each of the filtrate compartments 7 communicates through a filtrate pipe 8 with one of a plurality of annularly arranged ports 9 formed in one of the trunnions 5. In conformity with the usual practice, the ports 9 are adapted to register with a stationary valve body (not shown) associated with the end of the valve trunnion 5 and by means of which each of the filtrate compartments 7 may be successively subjected to a differential filtering pressure and to a reverse pressure, as desired. Secured to the valve trunnion 5 within a gear housing 11 is a ring gear 12 in mesh with a worm 13. The worm 13 is driven by a motor 14 through a pulley wheel 15, a belt 16, a pulley wheel 17, and a set of reducing gears carried in a gear housing 18.

Secured to the tank 1 adjacent the descending side of the drum and below the horizontal center line of the drum, is a conventional discharge doctor or scraper 19 provided with suitable means for adjusting its inclination.

Seated within each of the filtrate compartments 7 on shoulders 21 formed in the division strips 6 is a cast iron drainage member or screen 22. As shown in Figure 2, the drainage member 22 is made in the form of a rectangular frame provided with a plurality of spaced, diagonally disposed lands or ribs 23, between which the filtrate may pass on its way to the filtrate pipes 8. Extending across the under side of this frame intermediate its ends is a stiffening member 24 provided with a drilled and countersunk boss 25. The drainage members, as above stated, are supported at their ends on the shoulders 21 of the division strips 6 and are secured in place intermediate their ends by a machine bolt passing through the boss 25 and screwed to the drum 3. If the face of the drum is relatively narrow, only one drainage screen need be used for each of the filtrate compartments, although the number used depends entirely upon the length of the drum.

As shown in Figures 2 and 3, two or more of the ribs 23 of each of the drainage members 22 are drilled with a bore 26 for the reception of a copper rivet 27, the upper face of the rib at this point being recessed as at 28 to permit the head 29 of the rivet to lie flush with the upper face of the ribs 23. The rivets 27 are designed to have a force fit within the bores 26. If the ribs 23 are too narrow to permit drilling with a bore sufficiently large to accommodate the rivet 27, they may be cast with an enlarged portion 31 at this point.

After the rivets have been driven into place, their heads are tinned and then the wire mesh undercover 32 is disposed over the drainage member and soldered to the tinned heads of each of the rivets of each of the drainage members. This having been done, a wire mesh filter medium 33 is disposed over the undercover 32 and soldered thereto at spaced points such as 34. In some instances the undercover may be dispensed with and in such cases the filter medium 33 is soldered directly to the rivets 27. In either case, sufficient heat can be applied to the screen and through the screen to the rivet heads to effect a perfect bond between the screen and the rivet heads, the transfer of heat from the soldering iron through the rivets to the cast iron screen being negligible. A seal between the lines of contact of the screen and each of the division strips may be effected in accordance with standard practice by the use of any suitable sealing compound so that each of the filtrate compartments can function as an independent filter.

A filter made in accordance with the above disclosure has the following advantages:

Although not illustrated in the drawing, the continuous rotary drum filter or sheet former above disclosed is designed to be provided with press rolls for engaging the outer surface of the sheet formed and carried on the filter drum. The action of such a press roll not only serves to compress the sheet, but also results in forcing the filter medium and undercover against the drainage member. To avoid injury to the undercover, the outer surface of the ribs of the drainage member must be smooth, and unless the undercover is rigidly secured to the drainage members, creepage of the undercover over the drainage members will take place. This would result in a distortion of the warp and woof threads of the undercover and the filter medium, and undue wear of both of these members.

By the insertion of copper rivets in the ribs of the cast iron drainage members, either the undercover or the filter medium may be rigidly soldered to the drainage members at a plurality of spaced points on the surface of the undercover, thereby preventing any creepage of the screen over the drainage members and obviating the wear which would result from any creepage of this kind. Since in accordance with my invention the use of a spirally wound wire over the filter medium is not necessary, a more uniform sheet is obtained, and one which is free of the weakened zones normally resulting from the use of wire winding.

It will therefore be seen that a filter constructed in accordance with the disclosure herein made, will produce a continuous sheet of uniform thickness free of weakened zones and of a sufficiently high tensile strength to pass from the filter through press rolls and drier rolls and to be wound on a winder into suitable rolls for economical transportation and storage.

Although the drainage members or screens used in high density thickeners are for the most part made of cast iron, to which a wire mesh screen can not be directly soldered, the use of copper rivets for indirectly securing either the undercover or the wire mesh filter medium to the drainage members is not necessarily limited to cases wherein the drainage member is made of cast iron, but may be resorted to in any case wherein it is difficult to make a direct bond between the undercover or the filter medium and the drainage member, irrespective of the particular material of which the drainage member is made. Also, the rivets may be made of any material capable of making a bond with a suitable soldering material.

I claim:

1. In a filter cell: a ribbed metal drainage member of a difficultly-solderable material; a plurality of solderable metal rivets secured to the ribs of said drainage member with their heads lying substantially flush with the outer surfaces of the ribs of said drainage member; and a wire mesh screen disposed over said drainage member and soldered to the heads of said rivets.

2. A filter comprising: a filter cell; a plurality of spaced ribs secured within said cell and defining drainage channels for the passage of filtrate; a plurality of rivets secured to said ribs with their heads substantially flush with the outer surfaces of said ribs; and a wire mesh screen disposed over said cell and soldered to the heads of said rivets.

3. A filter comprising: a filter cell; a filtrate outlet communicating with said cell; a plurality of spaced ribs secured within said cell and defining filtrate passages; rivets secured to some of said ribs with their heads substantially flush with the outer surfaces of said ribs; an undercover of wire mesh screen soldered to the heads of said rivets; and a filter medium secured over said screen.

4. A filter comprising: a filter cell; a cast iron drainage member secured within said cell and provided with a plurality of spaced ribs, some of said ribs being drilled for the force fit reception of rivets; rivets secured to said drilled ribs with their heads substantially flush with the outer faces of said ribs; and a wire mesh screen disposed over said cell and soldered to said rivets.

5. A filter comprising: a filter cell arranged to travel in a closed path through a body of material to be filtered; a ribbed drainage member secured within said filter cell; rivets secured to some of the ribs of said drainage member with their heads substantially flush with the outer faces of said ribs; and a wire mesh screen disposed over said cell and soldered to the heads of said rivets.

6. A rotary drum filter comprising: a tank; a filter drum arranged to rotate in said tank; a plurality of peripherally spaced, longitudinally extending division strips secured to said drum and defining a series of filtrate compartments; conduits communicating with each of said filtrate compartments and through which said compartments can be successively subjected to a differential filtering pressure; a plurality of spaced ribs secured to said drum within each of said compartments; rivets secured to some of said ribs with their heads substantially flush with the outer surfaces of said ribs; and a wire mesh screen disposed over said drum and soldered to the heads of said rivets.

HAROLD F. OSWALD.